United States Patent [19]

Tuttle

[11] Patent Number: 5,480,475
[45] Date of Patent: Jan. 2, 1996

[54] VAPOR RECOVERY SYSTEM

[75] Inventor: Willard N. Tuttle, Tulsa, Okla.

[73] Assignee: Callidus Technologies, Inc., Tulsa, Okla.

[21] Appl. No.: 307,413

[22] Filed: Sep. 19, 1994

Related U.S. Application Data

[63] Continuation of Ser. No. 73,709, Jun. 9, 1993, abandoned.

[51] Int. Cl.$^6$ .......................... B01D 53/047; B01D 53/14
[52] U.S. Cl. .................. 96/122; 96/130; 96/133; 55/233; 55/356
[58] Field of Search ..................... 95/92–94, 98, 95/99, 101, 102, 106, 146, 188, 199, 229, 237; 96/113, 122, 127, 128, 130, 133; 55/223, 233, 356

[56] References Cited

U.S. PATENT DOCUMENTS

| | | | |
|---|---|---|---|
| 1,773,224 | 8/1930 | Godel | 96/127 |
| 2,248,956 | 7/1941 | Carvlin et al. | 96/122 X |
| 2,947,379 | 8/1960 | Aubrey | 95/237 X |
| 3,164,452 | 1/1965 | Westeren et al. | 96/130 X |
| 3,217,465 | 11/1965 | Fontaine et al. | 96/122 X |
| 3,258,899 | 7/1966 | Coffin | 96/130 X |
| 3,323,291 | 6/1967 | Kern | 96/130 X |
| 3,323,292 | 6/1967 | Brown | 96/130 X |
| 3,324,631 | 6/1967 | Kreuter | 96/130 X |
| 3,735,563 | 5/1973 | Adams | 96/127 |
| 4,065,272 | 12/1977 | Armond | 95/101 |
| 4,066,423 | 1/1978 | McGill et al. | 95/92 |
| 4,261,716 | 4/1981 | Schwartz et al. | 96/127 |
| 4,276,058 | 6/1981 | Dinsmore | 95/93 |
| 4,305,734 | 12/1981 | McGill | 95/102 |
| 4,322,228 | 3/1982 | Myers et al. | 96/122 X |
| 4,331,456 | 5/1982 | Schwartz et al. | 95/93 |
| 4,338,101 | 7/1982 | Tuttle | 95/93 |
| 4,343,629 | 8/1982 | Dinsmore et al. | 95/93 |
| 4,462,811 | 7/1984 | Dinsmore et al. | 95/92 X |
| 4,509,959 | 4/1985 | McCombs | 96/130 X |
| 4,543,109 | 9/1985 | Hamlin et al. | 96/130 X |
| 4,670,028 | 6/1987 | Kennedy | 95/92 |
| 4,963,168 | 10/1990 | Spencer | 96/122 |
| 4,983,190 | 1/1991 | Verrando et al. | 95/98 X |
| 5,154,735 | 10/1992 | Dinsmore et al. | 95/92 |

Primary Examiner—Robert Spitzer
Attorney, Agent, or Firm—Breiner & Breiner

[57] ABSTRACT

A vapor recovery unit comprising a vapor inlet for taking up hydrocarbon vapor from a loading facility or the like, and thereafter alternately allowing the vapor to flow to one of at least two adsorber vessels. Each adsorber vessel includes an entry port in the bottom of the adsorber vessel for receiving vapor. Hydrocarbons are retained on activated carbon beds in the adsorber vessels, resulting in purified air or other carrier gas which is removed through a discharge port also in the bottom of each adsorber vessel and released through an elevated vent to the atmosphere. Hydrocarbon vapor is desorbed from the adsorber vessel by a vacuum system and directed to a separator/absorber vessel wherein the desorbed vapor which has passed through the vacuum system is brought into contact with a hydrocarbon absorbent liquid or condenser. In use, when one adsorber vessel is taking in vapor from the vapor inlet, the other adsorber vessel is having its adsorbent bed desorbed or regenerated. When the adsorbent bed is saturated, or if desired on a time cycle, the process will alternate. The adsorber vessels of the present invention do not require any flow lines or vent lines on the top of the adsorber vessels thereby allowing for easier maintenance and installation of the adsorber vessels. The entire system is designed to be fitted to and located on a skid or skids.

9 Claims, 3 Drawing Sheets

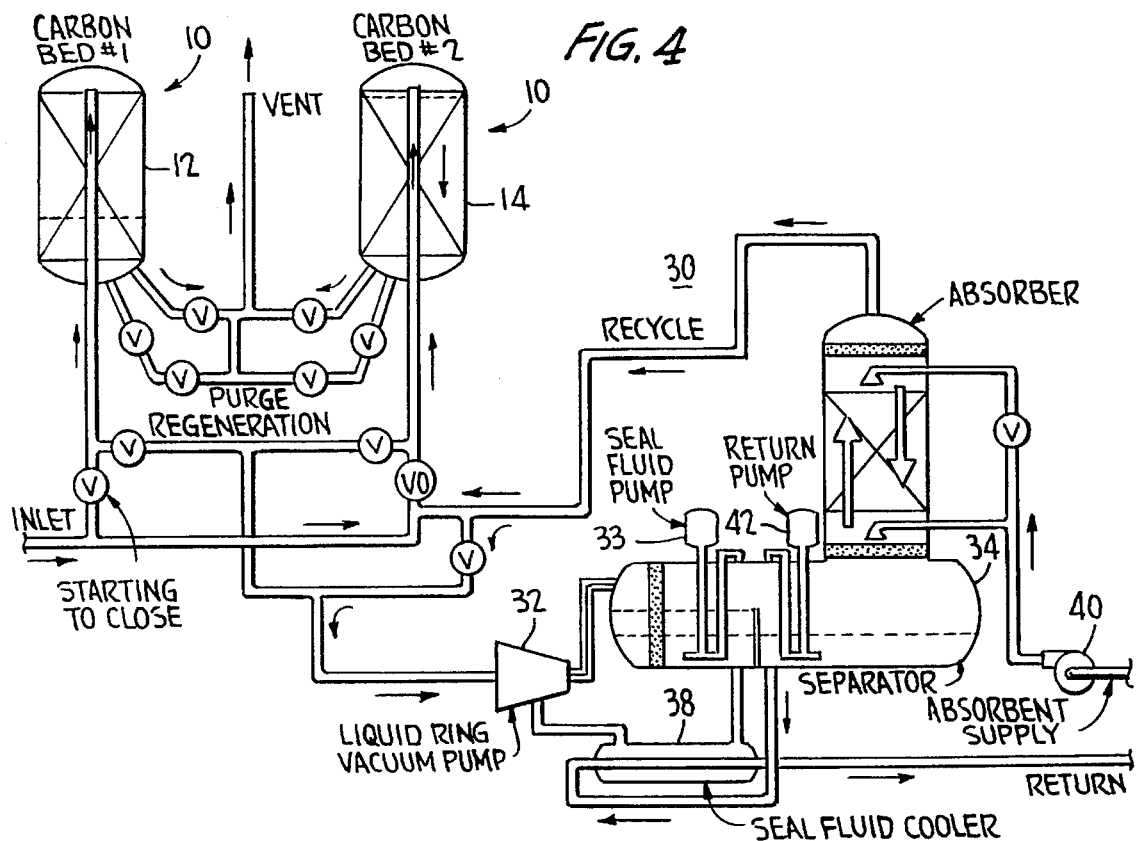
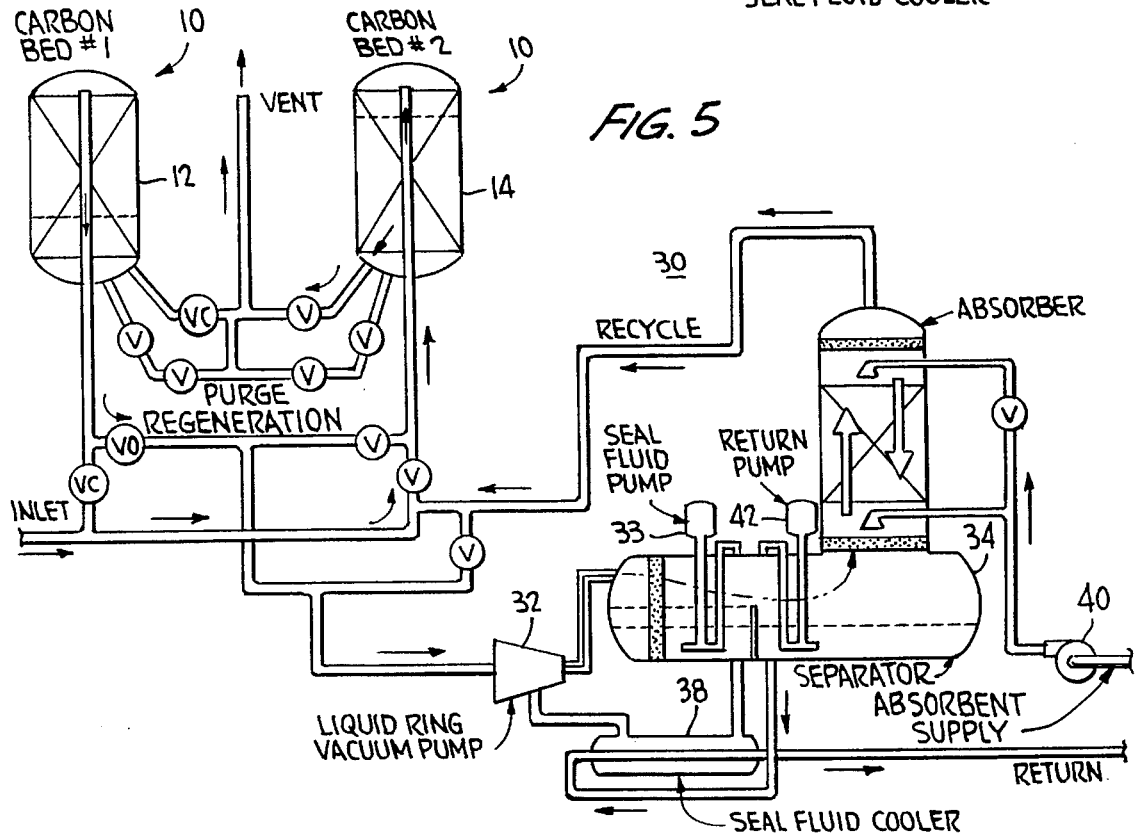

VAPOR RECOVERY SYSTEM

This is a continuation of U.S. application Ser. No. 08/073,709 filed on Jun. 9, 1993, now abandoned.

FIELD OF INVENTION

The present invention relates to a process and apparatus for the recovery of hydrocarbon vapors from hydrocarbon inert gas vapor mixtures. More particularly, the present invention relates to a simplified vapor recovery system which has increased safety and is more easily maintained.

BACKGROUND OF INVENTION

During the late 1970's and early 1980's, activated carbon-vacuum regeneration hydrocarbon vapor recovery systems were developed to meet the environmental requirements for vapor control at gasoline bulk terminals. These systems were originally designed to meet the clean air standards which were in force at the time. Since that time, the emission standards have become increasingly more strict, leading to the need to develop vapor recovery systems having a greater degree of efficiency. Such systems have generally been relatively complex, have safety problems, and in large measure are relatively difficult to maintain. Specifically, —U.S. Pat. No. 4,261,716 is directed to an apparatus for recovering hydrocarbons from an air-hydrocarbon vapor mixture including a pair of adsorbers containing beds of adsorbent having first and second connections on opposite sides of the beds, a first conduit means connected to the first connection of the adsorbers for conducting the air-hydrocarbon vapor mixture to the adsorber and for evacuating the adsorbers, a second conduit means connected to the second connection of the adsorbers for conducting residue gas exiting the adsorbers to the atmosphere, a vacuum pump having a suction connection and a discharge connection, a third conduit means connected between the suction connection of the vacuum pump and the first conduit means, an ejector jet pump disposed in the third conduit means, and an absorber.

—U.S. Pat. No. 4,276,058 is directed to a process for recovering hydrocarbons from an inlet air-hydrocarbon vapor mixture which includes the steps of (1) dividing a flow of liquid absorbent having an affinity for hydrocarbons into a first portion and a second portion, (2) passing the first portion of the liquid absorbent in heat exchange relationship with seal liquid used by a vacuum pump so that the seal liquid is cooled and the first portion of the liquid absorbent is heated, and (3), thereafter, contacting the air-hydrocarbon mixture produced in an adsorber with the heated first portion of the liquid absorbent so that a portion of the hydrocarbons are removed therefrom and a residue gas stream comprised of air and a portion of hydrocarbons is produced.

—U.S. Pat. No. 4,331,456 is directed to an improved process for recovering hydrocarbons from an inlet air-hydrocarbon mixture including the steps of evacuating a bed of activated carbon in an adsorber with a liquid seal vacuum pump while further evacuating the bed by an ejector jet pump.

—U.S. Pat. No. 4,338,101 is directed to a process for recovering hydrocarbons from an inlet inert gas-hydrocarbon vapor mixture including the steps of passing a cooling medium through a cooling jacket of a vacuum pump so as to cool the pump and an inert gas-hydrocarbon mixture pumped thereby.

—U.S. Pat. No. 4,343,629 is directed to a process and apparatus for recovering hydrocarbon from an inlet air-hydrocarbon vapor mixture including, inter alia, the cooling of beds of solid adsorbent by flowing a liquid absorbent through heat transfer coils disposed in the beds of solid adsorbent.

—U.S. Pat. No. 4,462,811 is directed to a process for recovering hydrocarbons from an air-hydrocarbon vapor mixture including (1) circulating absorbent liquid through an absorber during cycles of alternately desorbing first and second carbon beds and (2) interrupting the circulation of absorbent periodically during the initial period of desorption of each hydrocarbon bed until the level of hydrocarbon content in the air-hydrocarbon vapor exhausted from each carbon bed is sufficiently high to be at least partially absorbed in the absorber. Additionally, this patent discloses an apparatus for recovering hydrocarbons from an air-hydrocarbon vapor mixture including, inter alia, a control means for interrupting the flow of absorbent liquid periodically in response to the stage of desorption of an adsorber bed.

—U.S. Pat. No. 4,066,423 is directed to a process for recovering light hydrocarbon from an air-hydrocarbon mixture comprising adsorbing hydrocarbon components from an air-hydrocarbon mixture, absorbing substantially all of the adsorbed hydrocarbon components in an absorber operating with a sufficiently high L/V ratio to produce a constant composition absorber overhead gas containing hydrocarbon and a recovered liquid hydrocarbon mixed with the absorbent, cooling a portion of the recovered liquid hydrocarbon and recycling the cooled recovered hydrocarbon liquid for use as liquid hydrocarbon absorbent in the absorption step.

—U.S. Pat. No. 4,305,734 is directed to a process for recovering hydrocarbon components from a hydrocarbon-carrier gas mixture including the steps of (1) flushing an adsorbent material with a flushing stream of gas which will be adsorbed to a greater degree than the carrier gas so as to displace and vent the carrier gas from the adsorber and (2) lowering the pressure of the hydrocarbon laden adsorbent material so as to desorb the hydrocarbon components therefrom and produce a product stream rich in adsorbed hydrocarbon components.

—U.S. Pat. No. 4,670,028 is directed to a process in which hydrocarbon components are removed from an inlet air-hydrocarbon mixture and passed through a liquid hydrocarbon absorbent absorber wherein the improvement comprises producing a flashed absorbent stream by flashing an effective amount of liquid having an affinity to absorb hydrocarbon components from the inlet air-hydrocarbon mixture.

Although each of the above noted patents discloses vapor recovery systems having varying degrees of efficiency, there is a need for a system which is simplified, has a greater degree of safety and is more easily constructed and maintained.

SUMMARY OF INVENTION

The vapor recovery unit of the present invention includes a vapor inlet for taking up hydrocarbon vapor from a loading facility or other source of the vapors, and thereafter alternately allowing the vapor to flow to one of at least two adsorber vessels. Each adsorber vessel includes an entry port in the bottom of the adsorber vessel for receiving vapor. The vapor passes through the port into a pipe in the adsorber vessel to the top portion of the adsorber vessel. The vapor then flows downward through an activated carbon bed contained in the adsorber vessel. Hydrocarbons are retained on the activated carbon bed resulting in purified air or other carrier gas which is removed through a discharge port in the bottom of the adsorber vessel and released through an elevated vent to the atmosphere. Alternatively, atmospheric air, the purified air or other carrier gas can be returned to the adsorber vessel through a second entry port in the bottom of the vessel and used to purge the adsorber bed during the regeneration cycle resulting in the more complete desorption of the hydrocarbons retained on the bed. A vacuum system is utilized during the desorbing process.

The desorbed hydrocarbon vapor is taken from the adsorber vessel by a vacuum system and directed to a separator/absorber vessel wherein the desorbed vapor, air or carrier gas which has passed through the vacuum system is brought into contact with a hydrocarbon absorbent liquid or condenser. The absorbent liquid is fed to the separator/absorber vessel from a single line which is split into two lines so that the liquid absorbent or condensing liquid enters the column at two separate points. One line will enter the upper portion of the column and the liquid will pass through packing. The second line will enter the lower portion of the column by way of a spray nozzle. The recombined liquids are then present in the separator/absorber vessel which also contains the hydrocarbon-containing recovered product. Preferably for ease of manufacture and assembly of the absorber column and spray components, the absorber column is made in sections. Conventionally, flanging of the absorber column has been present beneath the lower spray nozzle. This then requires fitting of piping for both spray nozzles in the field at the time of installation of the apparatus. It has now been found, however, that if the flanging in the absorber column is positioned above the lower spray nozzle, the piping to the lower nozzle can be made in a shop at the time of manufacture and it does not have to be removed for shipping and eliminates fitting and installation in the field.

The separator/absorber vessel preferably includes two vertical immersion pumps. The first pump is a seal fluid pump if a liquid ring vacuum pump is being utilized, and the second pump is a hydrocarbon product return pump. Once the hydrocarbon-containing product is absorbed or condensed into the liquid, the liquid is passed to and through a seal fluid cooler. From the cooler, the liquid is returned to storage for reuse. Any non-absorbed or non-condensed hydrocarbon vapors and any hydrocarbon vapor which is stripped off by the air or carrier gas in the separator/absorber vessel will be released through the top of the absorber column and returned to the vapor inlet line so that it will thereafter pass through an adsorber vessel. In use, when one adsorber vessel is taking in vapor from the vapor inlet, the other adsorber vessel is having its adsorbent bed desorbed or regenerated. When the adsorbent bed is saturated, or if desired on a time cycle, the process will alternate.

The adsorber vessels of the present invention do not require any flow lines or vent lines on the top of the adsorber vessels thereby allowing for easier maintenance and installation of the adsorber vessels. Moreover, the entire system is designed to be fitted to and located on a skid. Thus, all motor operated valves are located on a skid which holds the regeneration portion of the vapor recovery system. Further, the purge lines for the adsorber vessels are, preferably, also positioned on the skid, which is possible due to the construction of the adsorber vessels. Since the vertical immersion pumps are contained within the separator/absorber vessel, the separator/absorber vessel can be on saddles directly on top of the skid rather than elevated on legs. Safety is improved by use of the vertical immersion pumps since if a seal in the vertical immersion pump fails, the fluid will remain in the separator/absorber vessel rather than flow into the surrounding environment.

DRAWING AND PRESENTLY PREFERRED EMBODIMENT

Having described the invention in general terms, a complete description of the invention will be set forth in reference to the drawing, wherein—

Figure 1:
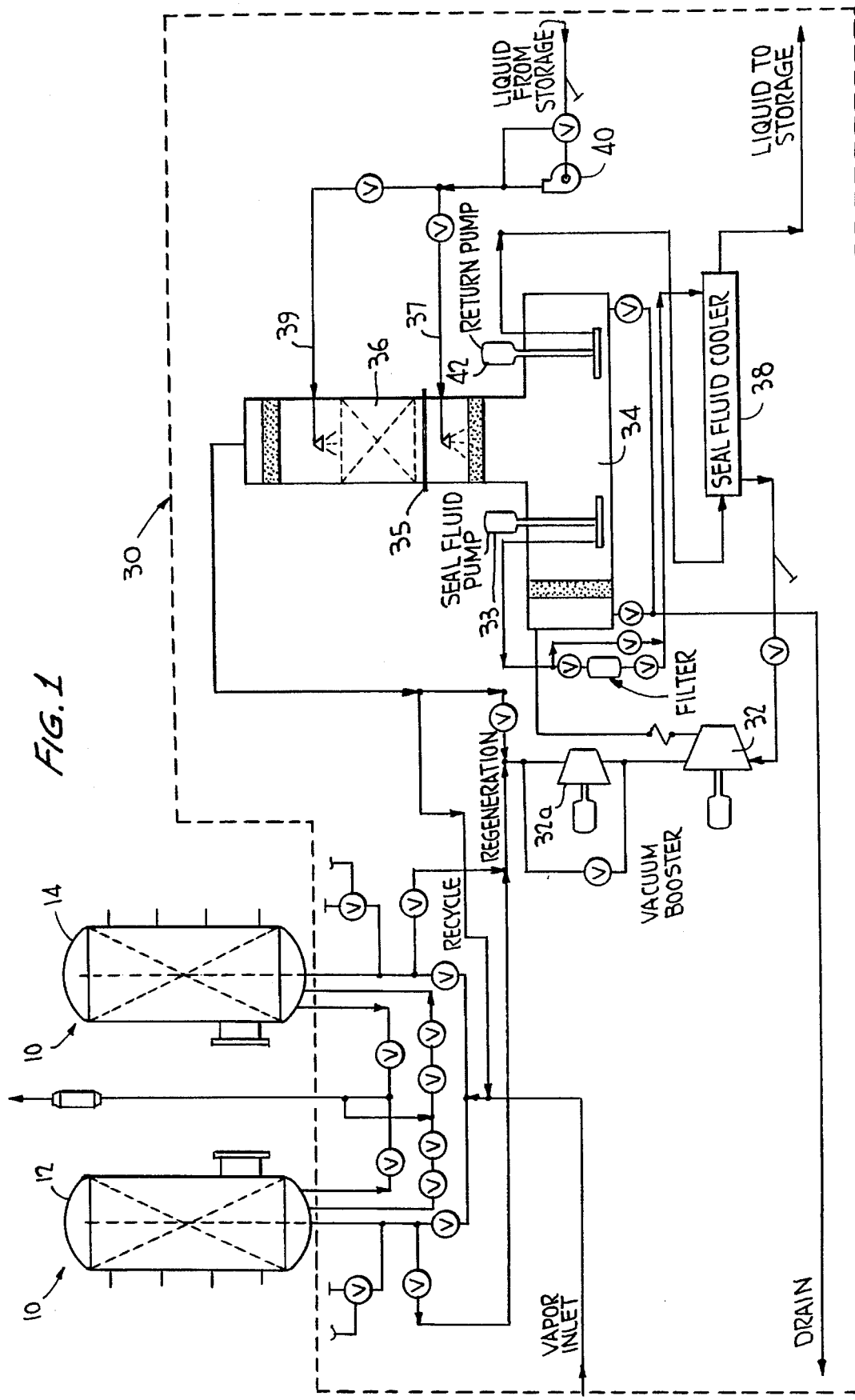
FIG. 1 is a flow diagram of a two-phase hydrocarbon vapor recovery system of the present invention illustrating that all valves and electrical items are situated on the skid.

FIG. 4 is the two-phase hydrocarbon vapor recovery system of FIG. 1 illustrating the system during step 2 of equalization with bed number 1 being on-stream but switching to bed number 2; and FIG. 5 is the two-phase hydrocarbon vapor recovery system of FIG. 1, wherein bed number 2 is on-stream and bed number 1 is beginning the regeneration cycle.

The vapor recovery systems of the present invention can be divided into two operating modules: the adsorption section 10 and the regeneration section 30. The adsorption section 10 includes carbon beds, in at least two separate vessels, for example bed number 1 (12) and bed number 2 (14), as illustrated with one on-stream receiving vapors from the loading operation and the second being regenerated. The carbon beds are sized with the primary purpose of separating the hydrocarbon from the inlet vapors. The vapors are a mixture of hydrocarbons and air, or other inert gas, which are displaced from the loading operation. The amount of activated carbon required for any given set of operating conditions is determined by the vapor flow from the loading facility and the hydrocarbon concentration of that vapor stream during a specified time cycle, usually a twelve or fifteen-minute cycle.

Once the amount of activated carbon has been calculated for use in each bed, it is necessary to determine the configuration of the carbon vessel, diameter and height, to hold the selected amount of activated carbon. This is required in order to set the pressure drop through the vapor side of the system. Thus, for a given amount of activated carbon a larger diameter, shorter vessel will have less pressure drop than a smaller diameter, taller vessel. Typically, the hydrocarbon vapors are transferred to the vapor recovery unit by the simple displacement of the vapor by the liquid product flowing into the transport vehicle. The pressure on the transport vehicle is usually limited to a total of eighteen inches of water column pressure, 0.65 psig. Other means of conveying the vapors to the vapor recovery unit can include fans, blowers, and the like.

A primary purpose of the regeneration section 30 is to properly regenerate the saturated activated carbon contained in a carbon bed within the predetermined time cycle. The carbon beds switch every cycle such that one bed 12 is being regenerated while the other bed 14 is receiving vapors from the loading operation.

The regeneration is preferably a two-step process. In the first step, the carbon vessel which has been isolated from the remainder of the process by switching valves, as best illustrated in FIG. 1, is pulled down to a very deep vacuum level. The second step is to allow a small amount of purge air or inert gas into the vent side of the carbon vessel during the last few minutes of the regeneration cycle. The purge can be accomplished by pulsing the stream so that the purge gas is flowing only during part of the purge cycle or by allowing the purge gas to flow continuously during the purge cycle. By pulsing the injection of the purge gas into the adsorbers and then allowing the vacuum to re-establish between the injection periods, allows for the use of less purge gas and will reduce the resultant amount of recycle. To achieve low emission at sea level, for example, 35 mg/l emission, the vacuum level required to remove the hydrocarbon compounds found in gasoline vapors is 27 inches of mercury vacuum or the level equal to 90% of absolute vacuum.

This vacuum level can be accomplished by the use of a liquid ring type vacuum pump 32. This type vacuum pump comes in a number of nominal sizes/capacities from vacuum pump manufacturers, and for economy standardized regeneration sections have been built around such nominal vacuum pump capacities. All of the other equipment on the regeneration skid, such as the separator 34, the absorber 36, the seal fluid cooler 38, the circulation pumps 40, 42, the piping, the valving, etc., have been sized around one of these nominal vacuum pump capacities. Depending on the number of carbon beds utilized in the adsorption section, a vacuum booster pump 32a, as shown in FIG. 1, can optionally be included.

The selected regeneration part of the system 30, which is coupled with a set of carbon vessels 12 and 14, is determined by other loading terminal parameters. These other parameters are the terminal throughput capacities; the one hour, the four hour and the daily loading rates, etc.

In typical operation, hydrocarbon vapors and air are displaced from the loading operation and flow to the vapor recovery unit. The switching valves are arranged so the vapors flow into one of the two activated carbon beds 12 or 14. The hydrocarbons in the vapor stream are selectively adsorbed onto the activated carbon, and the air is vented to the atmosphere. While bed number 1 (12) is on-stream to receive the vapors from the loading operation, the switching valves are set so bed number 2 (14) is in the regeneration mode.

The bed which is regenerating is pulled under vacuum to a level sufficient to remove, or desorb, the hydrocarbon. This regeneration step reestablishes the bulk of the working capacity within the activated carbon so that when that bed is cycled back on-stream there will be adequate capacity to adsorb the hydrocarbons to which it will be exposed.

Toward the end of the regeneration cycle and while the bed is still under the deep vacuum, a small amount of purge air is injected into the carbon bed near the vent. This small amount of purge air allows the carbon to be more thoroughly regenerated and aids in sweeping any residual hydrocarbons which may remain near the vent away so that when this vessel is placed back on-stream only air will be vented.

The cyclical operation is controlled by a Programable Logic Controller (PLC), not shown, which commands the operation of the switching valves. When the regeneration is completed on bed number 1 (12), the valves switch and place bed number 2 (14) in the regeneration mode. This switching action takes approximately one to two minutes, depending upon the size of the activated carbon beds. The majority of this equalization time is the time required to equalize the bed which had been under vacuum back to atmospheric pressure.

The cyclic operation continues until there is no longer an operation signal from the loading facility. When this signal is removed the unit will start its "post loading" operation, and each activated carbon bed will be regenerated one time. The "post loading" timer then turns off and the unit shuts down in a safe mode to await another operating signal. All of this is accomplished with the PLC.

In addition to the normal safety and shut-down features designed and incorporated into the vapor recovery system of this invention, to prevent injury to personnel or equipment, ladders and maintenance platforms essential on the older designs for servicing the vent valves on top of the carbon adsorption vessels have been eliminated since all of the staging valves have been placed on the skid, as best shown in FIG. 1.

Additionally, the skid profile has been reduced by eliminating the need to elevate the separator/absorber vessel 34, 36 and vacuum pump 32. The use of vertical immersion pumps for the liquid seal fluid pump 33 and liquid hydrocarbon return pump 42 has allowed for this feature. Not only is the profile reduced by the design of the present invention, but the chance of an accidental spill caused by a seal failure with the pumps in liquid service has been reduced. Moreover, the two external tubular level gauges and gauge cocks on the separator vessel of the older systems have been eliminated and replaced with weld pad sight glasses. This has reduced the risk of a spill in the event that one of the tubular level gauges is accidentally broken. Further, as described above, installation of the separator/absorber vessel can be simplified by providing absorber column 36 with flanging 35 above lower fluid or spray line 37. This allows the piping of each of lower fluid line 37 and upper fluid or spray line 39 to be made in a shop at the time of manufacture and not have to be removed for shipping or be fitted and installed in the field. Considerable labor and, thereby, cost savings are achievable utilizing this structure.

The vapor recovery systems of the present invention are easy to operate because there are few moving parts. Thus, the components which comprise the moving parts are pumps and motor operated valves and these are components which are understood by most terminal operating personnel. Typical maintenance is limited to simple checking and minor adjustments.

In the vacuum regenerated activated carbon technology of the present invention, technology which has been used successfully and efficiently for years has been refined whereby all motor operated staging and purge air valves are skid mounted for ease of installation, operation, and maintenance. This modification eliminates the need for costly ladders and service platforms on top of the adsorber vessels. It also eliminates the need to field install 25 to 30 additional control wires and conduit from the adsorber vessels to the control panel as required on the older designed systems.

Other improvements of the present invention include the elimination of the aluminum body solenoid valves and replacing them with small steel body motor operated valves, the replacement of tubular sight glasses with weld pad sight gauges, a redesign to reduce the profile of the skid and lower the vacuum pump to a more convenient height, the standardized use of a removable tube bundle seal fluid cooler, and others.

The hydrocarbon vapor recovery systems of the present invention, only require electrical power. Power is consumed only when the regeneration skid is in operation and under certain conditions power can be conserved by not starting the regeneration skid until a pre-set condition has been attained. This pre-set condition is usually a totalized volumetric flow measurement of liquid product into the transport vehicles. In this mode, one of the activated carbon adsorbers will be in service, adsorbing vapors, while the regeneration skid is in stand-by, no electrical power is being consumed. When the pre-set condition is reached, the regeneration skid will start up, the adsorber beds will switch and the adsorber previously in service will be regenerated.

The usual sequence of operation is for the regeneration skid to start up once loading commences. Since the carbon adsorbers are passive, i.e., they do not require electrical power to adsorb the vapors and the regeneration skid does not need to be operating to adsorb vapors, in the stand-by mode a vapor/air mixture can flow into the activated carbon vessels and the cleaned air flow out of the vessels because the valves had been properly positioned when the unit is shut down.

Figure 2:
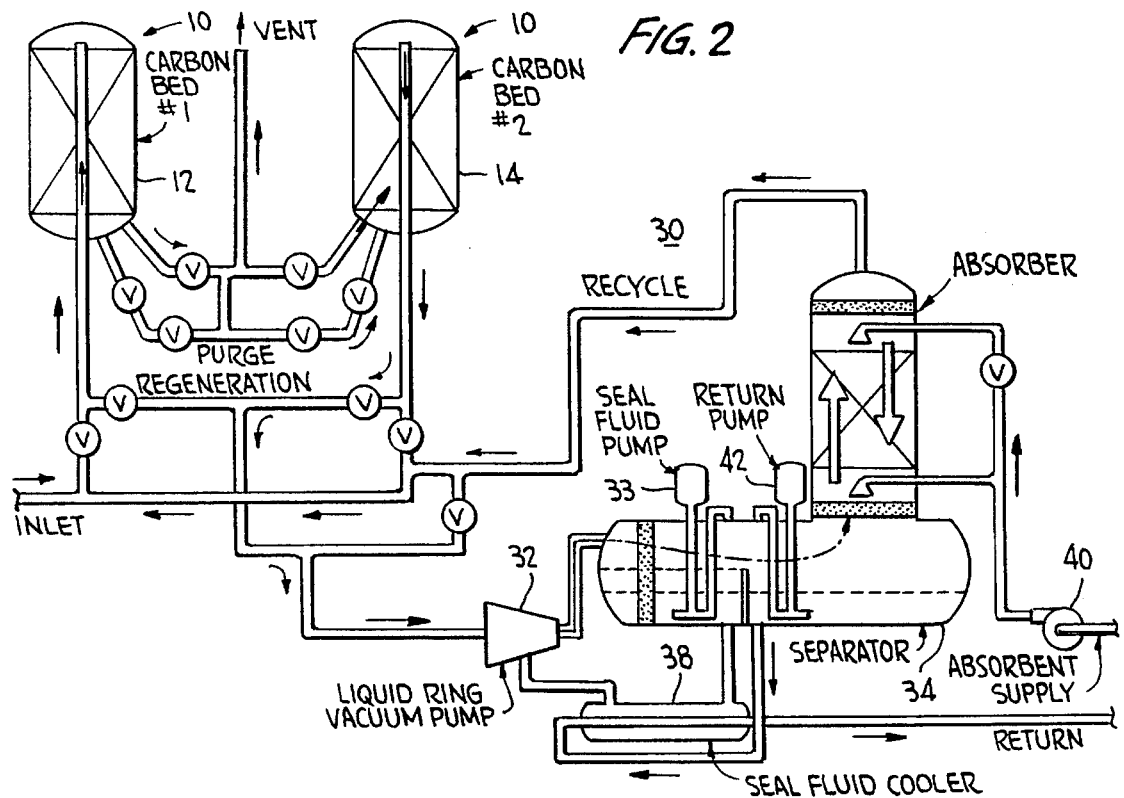
FIG. 2 is a simplified illustration of the two-phase hydrocarbon vapor recovery system of FIG. 1 showing direction of flow of fluids when bed number 1 is on-stream and bed number 2 is near the end of the regeneration cycle.
Figure 3:
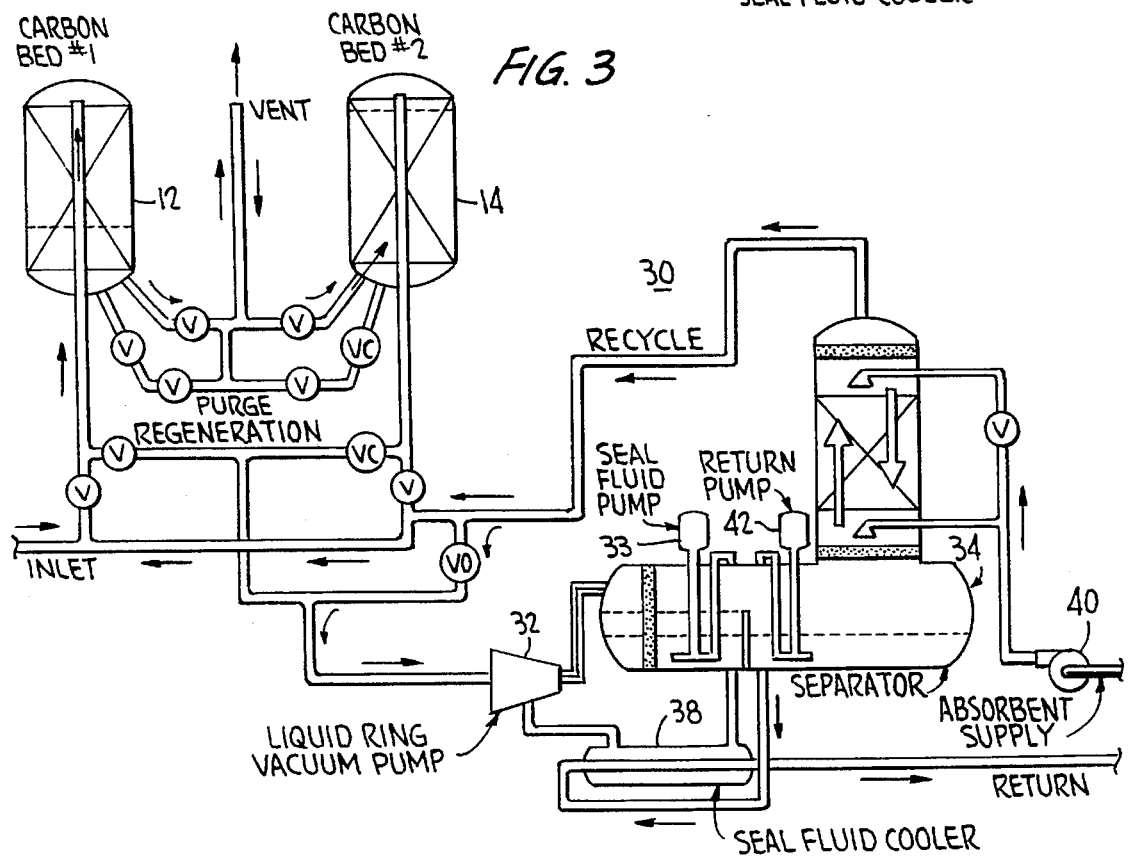
FIG. 3 is the two-phase hydrocarbon vapor recovery system of FIG. 1 illustrating the system during step 1 of equalization with bed number 1 being on-stream.

A typical sequence of operation is illustrated in FIGS. 2–5. In FIG. 2, bed number 1 is on stream with the flow from the loading facility being directed to bed number 1. Bed number 2 is near the end of the regeneration cycle. In FIG. 3, bed number 1 is on stream but is undergoing Step 1 of an equalization process. FIG. 4 shows the second step of the equalization of bed number 1 on stream switching to bed number 2, which has now been fully regenerated. FIG. 5 illustrates the various flow directions when bed number 2 is on stream and bed number 1 is at the beginning of the regeneration cycle.

As is apparent, the present invention defines a simplified vapor recovery system which is easily maintained, has improved safety features, and which has conventional components permitting the construction and installation of the vapor recovery unit at a lower cost.

The present application describes presently preferred embodiments. It is understood, however, that various modifications can be made in the embodiments to provide a vapor recovery system having the advantageous attributes of the present invention as will be known to one skilled in the art.

It is claimed:

1. A vapor recovery unit comprising a vapor inlet for taking up hydrocarbon vapor, at least two adsorber vessels, each of said adsorber vessels including an entry port for receiving vapors in the bottom thereof connected to closed pipe means within each of said vessels and which pipe means extends from said entry port to the top of each of said vessels discharging vapors received at the entry port at the top of each of said vessels; a bed of solid adsorbent having an affinity for hydrocarbons contained in each of said adsorber vessels; an outlet port in the bottom of each of said adsorber vessels for discharging vapors from said adsorber vessels after passing through said solid adsorbent; valve means for alternately directing said hydrocarbon vapors from said vapor inlet to one or the other of said entry ports of said at least two adsorber vessels; a vacuum system connected by connector means to an outlet in the bottom of each of said at least two adsorber vessels, said connector means permitting for alternately desorbing said adsorbent beds in said adsorber vessels; means for directing vapors desorbed from said absorbent beds through said vacuum system to a separator-absorber vessel wherein said desorbed vapors are brought in contact with a hydrocarbon absorbent liquid for recovery of a complete volume of hydrocarbon absorbent liquid including means for feeding said hydrocarbon absorbent liquid directly to said absorber vessel for passage to said separator; means for flowing said complete volume of said hydrocarbon absorbent liquid from said separator directly to cooler means and means for direct return of said hydrocarbon absorbent liquid to absorbent liquid storage.

2. The vapor recovery unit of claim 1 wherein said solid adsorbent is activated carbon.

3. The vapor recovery unit of claim 2 wherein said vacuum system includes a liquid ring vacuum pump.

4. The vapor recovery unit of claim 3 wherein said hydrocarbon vapors are carried in a carrier gas and wherein the carrier gas for said hydrocarbon vapors which is separated from the adsorbed hydrocarbon vapors is removed through the outlet port at the bottom of the vessel and vented to the atmosphere.

5. The vapor recovery unit of claim 3 wherein said hydrocarbon vapors are carried in a carrier gas and wherein the carrier gas is removed from the outlet port in the bottom of the adsorber vessel and returned to the adsorber vessel through a second entry port in the bottom of the vessel and used to charge the adsorber bed during the regeneration cycle.

6. The vapor recovery unit of claim 1 wherein said means for feeding said liquid absorbent is a single line, said single line including means to split the liquid flow so as to enter the absorber vessel at two separate points.

7. The vapor recovery unit of claim 6 wherein said means to split the liquid flow includes an upper spray line and a lower spray line and the separator-absorber vessel includes an absorber column which contains flanging positioned above said lower spray line.

8. The vapor recovery unit of claim 7 wherein said vapor recovery unit is constructed and arranged to be fitted to a skid.

9. The vapor recovery unit of claim 6 wherein the separator-absorber vessel includes two vertical immersion pumps for circulating said liquid absorbent and the regenerated hydrocarbon, the first of said two pumps being a sealed fluid pump and the second pump being a hydrocarbon product return pump.

\* \* \* \* \*

UNITED STATES PATENT AND TRADEMARK OFFICE
CERTIFICATE OF CORRECTION

PATENT NO. : 5,480,475
DATED : January 2, 1996
INVENTOR(S) : Willard N. Tuttle

It is certified that error appears in the above-indentified patent and that said Letters Patent is hereby corrected as shown below:

Column 3, lines 19/20, "separator/absorber" should read
-- separator/-absorber --;

Claim 1, column 8, line 9, "from said absorbent beds" should read
-- from said adsorbent beds --.

Signed and Sealed this

Twenty-fourth Day of September, 1996

Attest:

BRUCE LEHMAN

Attesting Officer     Commissioner of Patents and Trademarks